(12) United States Patent
Schillmeier et al.

(10) Patent No.: US 7,868,835 B2
(45) Date of Patent: Jan. 11, 2011

(54) BEAM SHAPING MEANS FOR EXTERNAL AND/OR ROOF ANTENNAS ON VEHICLES, AND ASSOCIATED ANTENNA

(75) Inventors: Gerald Schillmeier, München (DE); Frank Mierke, München (DE); Thomas Lankes, Rosenheim (DE)

(73) Assignee: Kathrein-Werke KG, Rosenheim (DE)

( * ) Notice: Subject to any disclaimer, the term of this patent is extended or adjusted under 35 U.S.C. 154(b) by 301 days.

(21) Appl. No.: 12/202,559

(22) Filed: Sep. 2, 2008

(65) Prior Publication Data

US 2010/0053004 A1 Mar. 4, 2010

(51) Int. Cl.
*H01Q 1/32* (2006.01)
(52) U.S. Cl. .................................. 343/713; 343/711
(58) Field of Classification Search ............ 343/711, 343/712, 713, 846
See application file for complete search history.

(56) References Cited

U.S. PATENT DOCUMENTS

| | | | |
|---|---|---|---|
| 5,760,744 A | 6/1998 | Sauer | |
| 6,441,792 B1 | 8/2002 | Sievenpiper et al. | |
| 6,831,611 B2 * | 12/2004 | Ooe et al. | 343/713 |
| 7,154,444 B2 * | 12/2006 | Sievenpiper | 343/713 |
| 7,321,338 B2 | 1/2008 | Komatsu | |
| 7,431,386 B2 * | 10/2008 | Schoenauer et al. | 296/215 |
| 2002/0175868 A1 * | 11/2002 | Reichert | 343/713 |
| 2003/0034926 A1 | 2/2003 | Veerasamy | |
| 2004/0196197 A1 | 10/2004 | Sievenpiper | |
| 2007/0001914 A1 * | 1/2007 | Robnett et al. | 343/713 |
| 2007/0171137 A1 * | 7/2007 | Mierzwa et al. | 343/713 |
| 2007/0187382 A1 | 8/2007 | Mauser | |

FOREIGN PATENT DOCUMENTS

| | | |
|---|---|---|
| DE | 3834075 A1 | 4/1989 |
| DE | 4339162 A1 | 5/1995 |
| DE | 4403643 A1 | 8/1995 |
| DE | 44 20 903 C1 | 1/1996 |
| DE | 195 13 263 A1 | 10/1996 |
| DE | 198 52 184 A1 | 5/2000 |
| DE | 103 33 618 B3 | 3/2005 |
| DE | 20221153 U1 | 6/2005 |

(Continued)

OTHER PUBLICATIONS

Examination report issued in corresponding German patent application 10 2008 039 125.5-55 (Mar. 18, 2009).

(Continued)

*Primary Examiner*—Hoang V Nguyen
(74) *Attorney, Agent, or Firm*—Nixon & Vanderhye PC (57) ABSTRACT

An improved beam shaping means for an external and/or roof antenna has a parasitic beam shaping means configured at a distance below the upper or outer surface of the electrically non-conductive region of the vehicle structure. The parasitic beam shaping means is configured, provided or attached in the material of the electrically non-conductive region of the vehicle structure or at the underside or inside of the electrically non-conductive region of the vehicle structure. The parasitic beam shaping means is arranged and/or configured in such a way that it, viewed from above, protrudes laterally beyond, at least in certain portions. The antenna mounting region or portion and/or an optionally provided counterweight surface and/or is arranged laterally thereto.

33 Claims, 8 Drawing Sheets

FOREIGN PATENT DOCUMENTS

| | | |
|---|---|---|
| DE | 102004011662 B4 | 10/2005 |
| DE | 102007007939 A1 | 12/2007 |
| DE | 603 15 787 T2 | 1/2008 |
| EP | 1343221 B1 | 9/2006 |
| GB | 2 290 417 A | 12/1995 |
| WO | WO9323890 | 11/1993 |

OTHER PUBLICATIONS

International Search report in corresponding PCT application PCT/EP2009/005359 (Dec. 30, 2009).

* cited by examiner

BEAM SHAPING MEANS FOR EXTERNAL AND/OR ROOF ANTENNAS ON VEHICLES, AND ASSOCIATED ANTENNA

CROSS-REFERENCES TO RELATED APPLICATIONS

None.

STATEMENT REGARDING FEDERALLY SPONSORED RESEARCH OR DEVELOPMENT

None.

FIELD

The technology herein relates to a beam shaping means for external and/or roof antennas on vehicles and to an associated antenna.

BACKGROUND AND SUMMARY

Nowadays, motor vehicles are equipped with external and/or roof antennas virtually as standard. Such antennas generally serve to receive radio programs.

However, many of the motor vehicle antennas currently in use also comprise antenna means and radiating elements, for example for a geostationary locating system, i.e. a positioning system (GPS system), and additional antenna means for mobile communications.

As different frequencies, for example what is known as the 900 MHz band, the 1,800 MHz band, the 1,900 MHz band or else for example the UMTS frequencies (i.e. in the 1,920 to 2,170 MHz range), are important in mobile communications, motor vehicle antennas currently in use are frequently configured as what are known as multiband antennas which can be used in all these frequency ranges.

Known in principle are disk-type antennas which can be integrated, for example, in a rear pane of a motor vehicle window. Such disk-type antennas generally have in this case in the window a printed circuit which acts as an antenna and which can be used for example also as a heating field.

Also known are antennas which can be bonded to a rear window. The radiator is located on the outside of the window. The underside of the antenna base (antenna housing) is for this purpose bonded to the outer surface of the window, the counterpiece, which interacts with the antenna, being bonded on the inside of the window immediately below the antenna base, generally with the same or a smaller size, so that signals can be transmitted between the antenna base, which is located on the outside, and the electrical opposing surface, which is located on the inside of the window.

Otherwise, antennas are generally often arranged on the bodywork of the motor vehicle, conventionally on the roof of the motor vehicle toward the rear region, i.e. generally often just before the start of the rear window.

Modern generations of motor vehicle are distinguished by particularly large glass roofs, some of which are also referred to as panoramic roofs. They can comprise, in addition to a sliding roof, at least one unopenable glass roof lining, i.e. a corresponding glass roof, wherein a corresponding antenna can then be mounted on this electrically non-conductive glass roof.

For mounting an antenna of this type, a corresponding mounting region or portion is provided on the glass roof, conventionally in the form of a correspondingly large and electrically conductive counterweight surface which is pre-mounted on the panoramic or glass roof (or rear window) of the vehicle, in order to generate a corresponding antenna beam diagram.

An exemplary illustrative non-limiting implementation provides an improvement for antenna systems of this type, i.e. for external and/or roof antennas on vehicles, in particular on motor vehicles, with which improved beam shaping is possible.

An exemplary illustrative non-limiting implementation provides, using simple means, a significant improvement in the efficiency and the effectiveness of external and/or roof antennas on vehicles and in particular on motor vehicles.

An exemplary illustrative non-limiting implementation can in this case be used above all on electrically non-conductive outer linings of motor vehicles. Of particular importance are in this regard glass roofs, some of which are referred to as panoramic roofs on account of their large size. Likewise, the invention can also be used in other glass windows in a vehicle, in particular a motor vehicle, even in vehicle linings made for example of plastics material, and thus of electrically non-conductive materials, in contrast to bodywork metal sheets.

An exemplary illustrative non-limiting implementation proposes and provides an additional beam shaping means with which significant improvements with regard to beam shaping, and thus with regard to the receiving and transmitting properties of an antenna, can be achieved.

In an exemplary illustrative non-limiting implementation there is provided, generally on an electrically non-conductive portion of a bodywork lining, i.e. in particular on an electrically non-conductive motor vehicle roof or a motor vehicle window and the like, an antenna mounting region or portion, generally in the form of a sufficiently large electrically conductive counterweight surface.

In order to achieve the improved antenna properties, the manufacturer can itself now provide for the additional provision of an electrically conductive parasitic beam shaping means below the antenna mounting region or portion, i.e. above all also below a correspondingly electrically conductive counterweight surface in the material of the motor vehicle lighting or therebelow (i.e. in particular in the material of the glass roof or below the glass roof).

This parasitic beam shaping means is of a size and/or position such that it is not shielded by the antenna mounting region or portion or at least by the chassis of a corresponding motor vehicle antenna to be built on, i.e. that the region of the parasitic beam shaping means reaches, at least in certain portions, further than the chassis of an antenna means to be mounted or reaches further than the aforementioned electrically conductive counterweight surface which is generally several times larger than the base surface of a chassis of an antenna means to be mounted.

The electrically conductive parasitic beam shaping means are in this case not electrically connected to the chassis of the antenna means or the electrically conductive counterweight surface.

In an exemplary non-limiting arrangement, the design (i.e. the design looking from above on to the planar parasitic beam shaping means) can be unsymmetrical, based on the mounting region or mounting portion of the antenna (i.e. on the position of the motor vehicle to be mounted and/or the orientation thereof) and, precisely by an unsymmetrical configuration of the parasitic beam shaping means, an improvement with regard to the radiation diagram of an antenna can be achieved.

This can be advantageous especially when the antenna is provided for reception of circularly polarized electromagnetic waves, such as are used for example in the reception of GPS signals on the one hand or for example in the reception of what are known as SDARS signals on the other hand, i.e. before receiving satellite-supported information and/or radio systems. The SDARS system is for example a satellite-supported digital radio service system which is conventional in USA.

The exemplary parasitic beam shaping means can be of differing configuration. It can for example have a grid structure with "perforated grid properties"; in this way, a plurality of conductors running parallel to one another can for example be arranged in a singly or multiply rotated arrangement relative to one another; i.e. in this way, a first, a second and optionally a third, etc. parallel grid structures can be arranged so as to overlap and intersect one another, which grid structures are electrically connected to one another at their nodal points.

Also possible however is a grid structure consisting merely of electrically conductive linear portions running parallel to one another, i.e. thus forming not a "perforated grid" but rather a "strip grid". Nevertheless, in all these cases, reference is sometimes made to a parasitic radiator surface or to a plurality of parasitic radiator surfaces, as this term best describes the parasitic beam shaping means.

Alternatively or additionally, it is also possible for the grid structure to consist of a large number of dot or circular areas (dots) or similarly configured "conductive islands" which are arranged sitting next to one another and thus produce a dot or island-type structure. The design of the individually conductive portions (dots) can be selected in different ways and does not necessarily have to be circular. Elliptical, symmetrical structures having round, convex and concave boundary lines and straight edge portions, etc., for example in the form of small squares and rectangles, hexagons, are also possible. To this extent, there are no limitations.

However, the aforementioned parasitic beam shaping means does not necessarily have to be implemented or embodied as a grid structure. Also possible is a parasitic radiator surface in the form of a self-enclosed area (in which for example individual, relatively large recesses could also be integrated), having elevated conductivity. This "closed area" can for example be a planar metal coating on the electrically non-conductive motor vehicle structure, preferably in the form of a glass window or panoramic window, a foil coated with metal or else a screen printed surface or the like which is electrically conductive. In addition, mixed systems with a grid structure and correspondingly larger closed areas having elevated electrical conductivity could also be provided.

Finally, it has also proven beneficial, but also sufficient, if the size of the parasitic beam shaping means is dimensioned in the manner of the aforementioned parasitic radiator surface or parasitic radiator surfaces in such a way that said parasitic beam shaping means has in the area surrounding the antenna a maximum extent which is for example not greater than 40 cm. However, in many cases, even smaller dimensions are sufficient, so that the parasitic radiator arrangement is provided in an area around the antenna that is not larger than 35 cm, 30 cm, 24 cm or 20 cm.

This parasitic radiator is preferably also produced by the manufacturer inside the plastics material, in particular inside a glass window intended for example for a glass roof or a rear window of a vehicle. This grid-like structure in the form of a parasitic radiator can however also be configured on the inside of the window and preferably also manufactured during the manufacturing process. Attachment to the outside is generally not desired simply because no electrical contact is intended to take place here with a counterweight surface which may be provided at this location and/or the electrically conductive chassis of an antenna to be built on.

As mentioned hereinbefore, a counterweight surface can first be provided, in particular on the glass receiving the antenna. The parasitic beam shaping means then extends around this electrically conductive counterweight surface and can in this case also be provided even below the counterweight surface. It is however also possible for the counterweight surface to be located for example within a cutout in the electrically non-conductive material of the vehicle structure, in particular in a cutout in a glass roof. The upper sides of the counterweight surface and of the glass roof can then lie at a common level, i.e. be flush with each other. In this case, the antenna connection cable would not penetrate the glass window, as the one or more electrical connection cables leading to the antenna can lead to the antenna directly via the counterweight surface and a cutout formed therein. The beam shaping means is located in this case below or laterally of the upper side of the counterweight surface. This provides a technically readily implementable and visually very attractive solution, wherein above all the upper side of the glass surface and of the counterweight surface can be flush or almost flush with each other.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
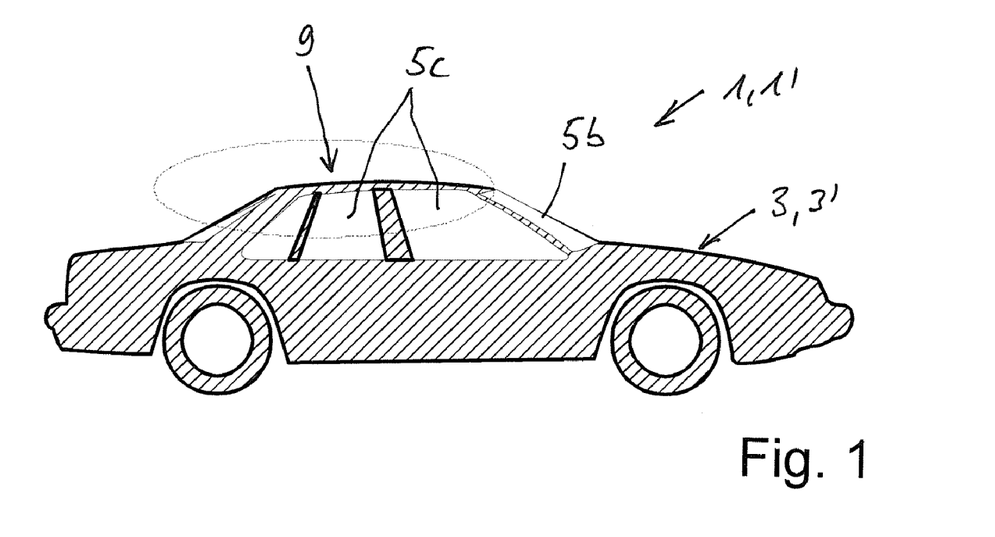
FIG. 1 is a schematic side view of a motor vehicle.

FIG. 1 is a schematic side view of a vehicle 1, namely a motor vehicle 1', which has in a known manner a vehicle structure 3 consisting largely of sheet metal or another form of metal, i.e. of electrically conductive bodywork parts 3', and of electrically non-conductive vehicle superstructures 3", in particular in the form of glass windows 5 which—when they are fitted in the roof region—are also referred to as a glass roof or panoramic roof 5a. Further glass windows are also provided in the form of front windows 5b, side windows 5c and rear windows 5d.

Figure 2:
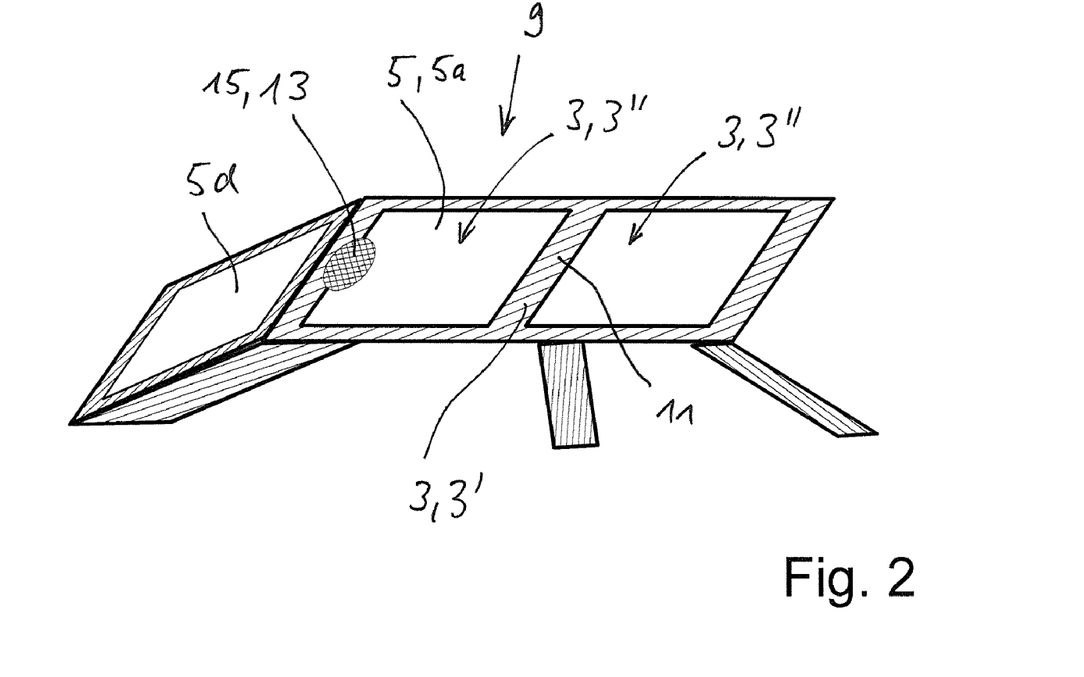
FIG. 2 is a schematic oblique partial view onto a motor vehicle roof and an associated rear window.

In the exemplary embodiment shown according to FIG. 2, it may be seen that, for example, the motor vehicle roof 9 is covered by a large glass window or panoramic window 5. A front roof cutout can for example also be covered by an openable and closable sliding roof, whereas a stationary roof window and/or glass window 5a is inserted in a rear region, separated for example by a roof cross strut 11.

Constructed and fastened in the rear region of this stationary roof window 5a is, in proximity to the region of transition to the rear window 5d on the outer surface of the roof 9, which is made of glass (i.e. of an electrically non-conductive material), a counterweight surface 13 which is made of electrically conductive material, in particular metal, and serves as an antenna mounting region or antenna mounting portion 15.

Figure 3:
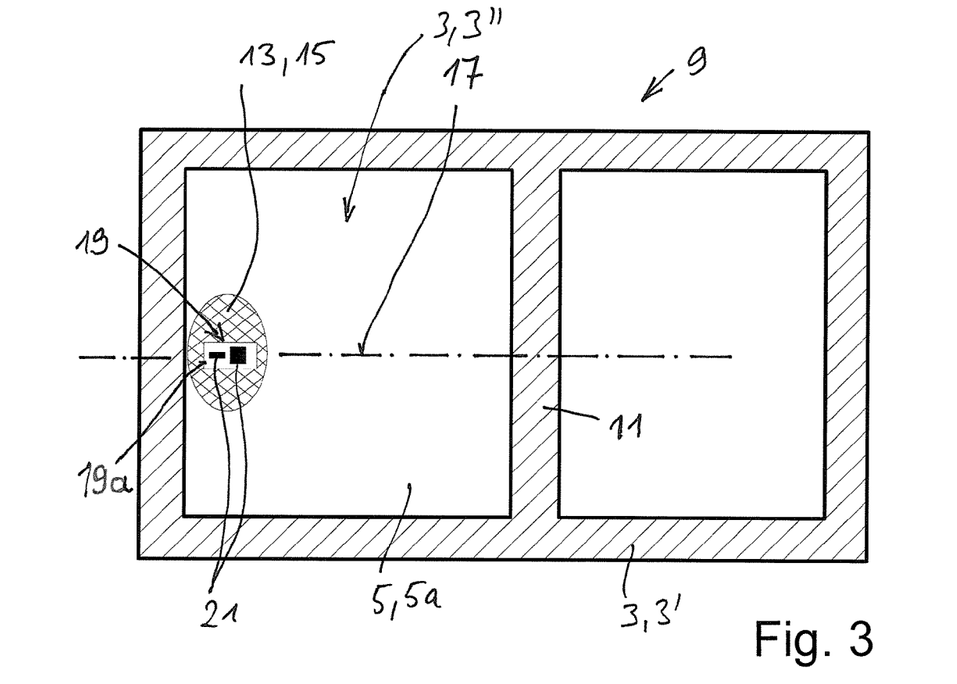
FIG. 3 is a schematic plan view onto a motor vehicle roof in the form of a panoramic roof with a counterweight surface, at the rear in the direction of travel, for mounting a motor vehicle antenna.

In the enlarged schematic plan view according to FIG. 3, it may be seen that there is provided, for example as the antenna mounting region and/or portion 15, the electrically conductive counterweight surface which is arranged on the roof 9 in such a way that it also lies centrally and symmetrically to a vertical central plane of symmetry 17 running in the longitudinal direction through the center of the vehicle 1. The external and/or roof antenna 19, which is mounted on the antenna mounting region and/or portion 15, is also mounted in such a way that it is arranged symmetrically to the above-mentioned vertical central plane of symmetry 17 running longitudinally through the vehicle 1.

FIG. 3 indicates in this case merely schematically that there can be provided within the interior of an antenna housing which covers the antenna 19, is permeable to electromagnetic radiation and is indicated merely in part in the figures, for example, a plurality of antenna radiators 19a, for example a GPS antenna, an SDARS antenna and a further mobile communications antenna which is configured for example on a vertically rising printed circuit board in the form of an electrically conductive surface and can if appropriate also be suitable for a plurality of frequency bands. These types of antenna are mentioned merely by way of example. Any other desired antenna means or types of antenna can be used.

As may be seen from FIG. 3, the counterweight surface 13 is if appropriate arranged there without contact to the electrically conductive bodywork 3, 3' on the insulating glass roof 5, 5a. The schematic view in FIG. 2 shows that the counterweight surface can, in its design and arrangement, also be placed in such a way that it overlaps with the electrically conductive vehicle bodywork 3' and/or is electrically connected thereto or is even part of the bodywork metal sheet and projects in the direction of the glass roof.

In order then to allow improved beam shaping and thus overall to improve the antenna performance, a parasitic radiator means 27 is provided according to the intervention—in order to contribute to improved reception and if appropriate improved transmission properties.

This parasitic beam shaping means 27, which will also occasionally be referred to hereinafter as the parasitic radiator means (and will also occasionally be referred to as the parasitic radiator surface or parasitic radiator surfaces 27), is arranged below the external and roof antenna 19, i.e. even below the counterweight surface 13. This counterweight surface 13 is in this case generally configured as a closed, electrically conductive area, in particular in the form of a metal sheet. It can in this case also be directly electrically connected to the bodywork. However, in this case too, modifications are possible insofar as the counterweight surface is optionally configured as a preferably fine-mesh grid, so that it acts as effectively as possible as the counterweight surface 13.

Figure 4:
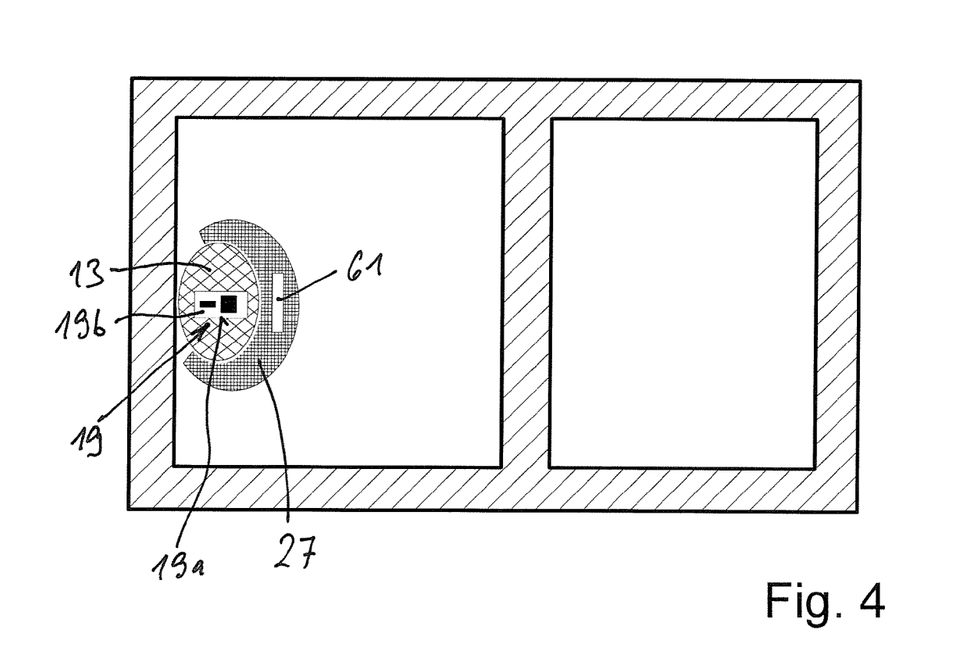
FIG. 4 is a plan view, corresponding to FIG. 3, onto a motor vehicle roof in the form of a panoramic roof with an exemplary illustrative non-limiting beam shaping means.

As may be seen from the plan view according to FIG. 4, the parasitic radiator means or beam shaping means 27 is, in terms of the position and/or size thereof, arranged or designed in such a way that it is not covered by the external or roof antenna 19 and in particular the associated antenna housing 19a or an antenna chassis 19b pertaining to the antenna housing 19a, but rather projects well beyond the counterweight surface 13 or the antenna housing 19a and the antenna chassis 19b, i.e. when viewed transversely or perpendicularly to the glass window 5.

Figure 4A:
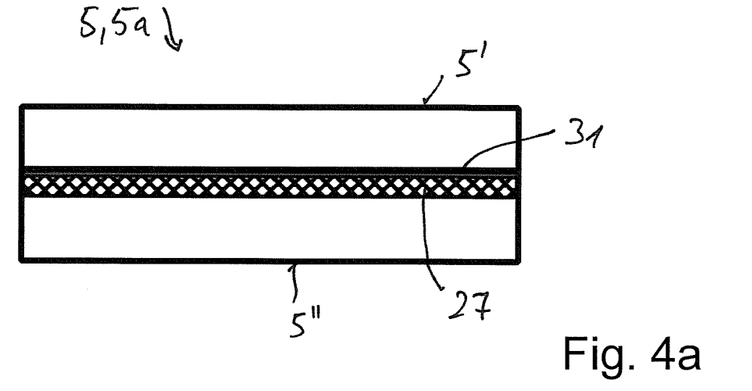
FIGS. 4a to 4c are three detailed crossed-sectional views through a motor vehicle glass roof with an exemplary illustrative non-limiting integrated parasitic beam shaping means.
Figure 4B:
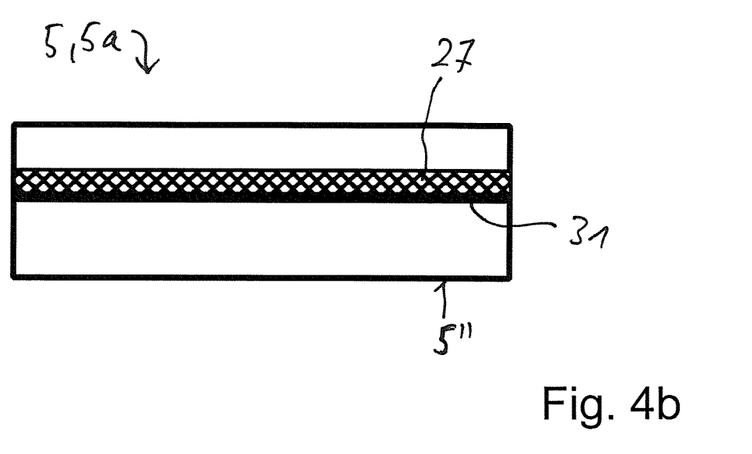
Figure 4C:
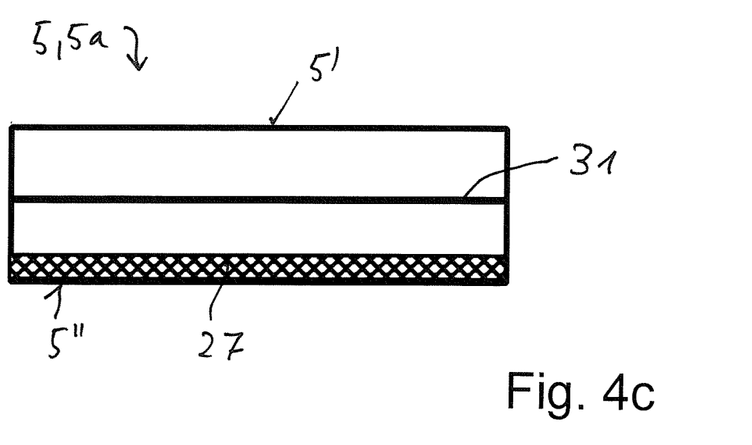

As may be seen from the schematic cross-sectional views according to FIGS. 4a to 4c, the parasitic beam shaping means 27 is provided not on the upper side or outside 5' of the glass windows 5, i.e. in particular of the roof window or panoramic window 5a, but rather inside the window 5 which is configured with a certain thickness 29.

In the exemplary embodiment according to FIG. 4a, it is shown that the window 5a, 5a generally has inside, for example, a thermal layer and/or a UV light-reflecting layer and/or a plastics material intermediate layer for forming a safety composite glass. These single or multiple layers are illustrated merely schematically in FIGS. 4a to 4c and provided with reference numeral 31. These possible layers are therefore also referred to simply as intermediate layers 31 for short.

The detailed cross-sectional view through the glass 5 according to FIG. 4a shows that the exemplary illustrative non-limiting parasitic radiator means or beam shaping means 27 is provided inside the material of the glass window 5 in a planar manner: in the exemplary embodiment according to FIG. 4a, below the at least one intermediate layer 31, preferably directly adjoining the intermediate layer 31.

In the exemplary arrangement according to FIG. 4b, this layer is provided in the form of the parasitic radiator means 27 above the intermediate layer 31. However, the at least one intermediate layer 31 and the layer consisting of the parasitic radiator means or beam shaping means 27 do not have to touch one another in a planar manner as in the exemplary arrangement according to FIGS. 4a and 4b, but rather can also be arranged set apart from one another at a distance, other intermediate layers or a further glass material layer being incorporated.

The non-limiting example according to FIG. 4c shows that the parasitic beam shaping means 27 can also be arranged at the underside or inside 5" of a glass window 5.

Preferably, the planar parasitic radiator means or beam shaping means 27 is not provided on the upper or outer surface 5', at least not when what is known as a "cover print" is additionally provided there on the outside of a window which, as is known, can consist of a large number of plastics material or rubber-type knobs or point structures.

Figure 5:
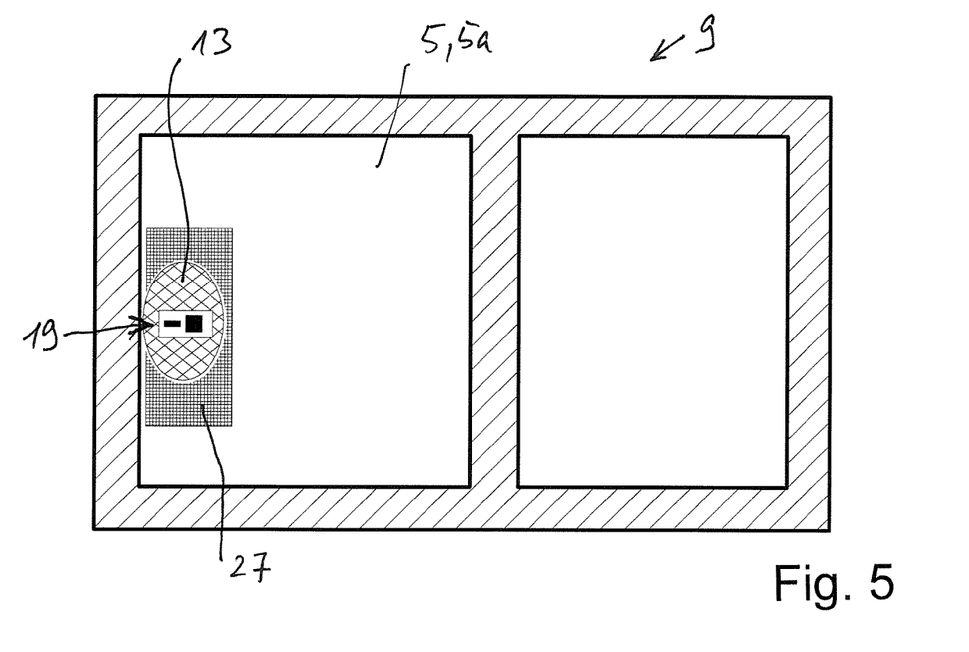
FIG. 5 is a view similar to FIG. 4, but with a different design for the exemplary illustrative non-limiting beam shaping means.
Figure 6:
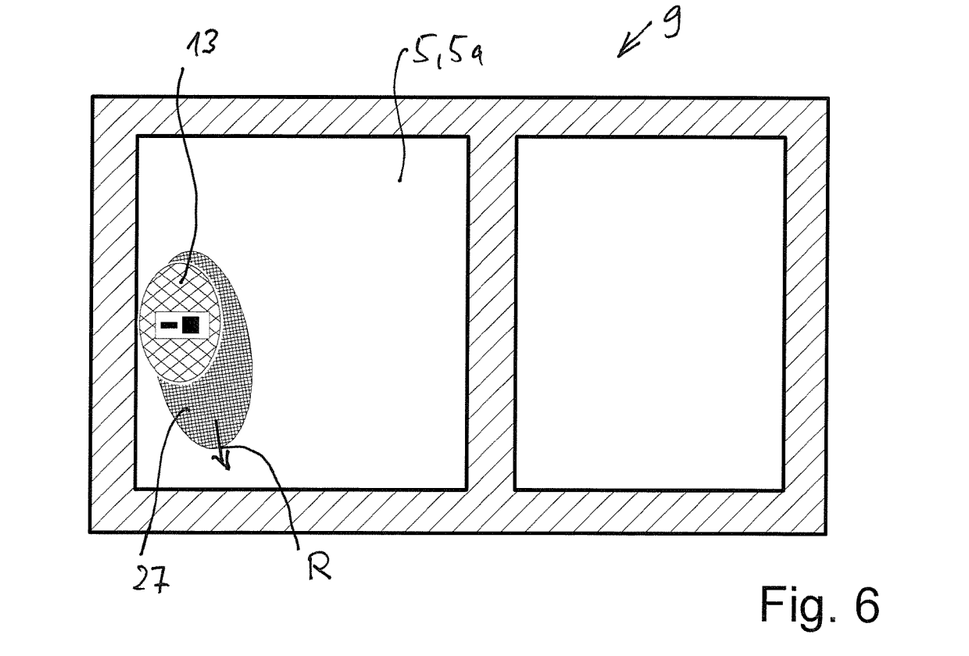
FIG. 6 shows a further modified exemplary arrangement with beam shaping means provided asymmetrically to the antenna means.

The outer contour 27a of the parasitic radiator surface 27 does not have to correspond or be similar to the design and outer contour of the counterweight surface 13, but rather may differ therefrom, as is shown for example with reference to FIGS. 5 and 6.

FIG. 5 shows that the parasitic radiator surface 27 can for example have, even in the case of a somewhat oval or crescent-shaped configuration of the counterweight surface 13, nevertheless for example a rectangular design or an elliptical design—as shown in FIG. 6—or at least approximate this shape; to some extent, this also corresponds merely to portions of such possible designs.

In the exemplary implementations shown, the parasitic radiator means or beam shaping means 27 can also be configured below the counterweight surface 13. This parasitic beam shaping means 27 is preferably of grid-type configuration; this will be examined in greater detail hereinafter. However, the parasitic beam shaping means 27 should above all be provided in an adjacent region or in portion regions adjacent to the counterweight surface 13 in order in this way to form a parasitically excited radiator means 27 which projects at least in certain portions beyond the counterweight surface 13 and is made of or comprises electrically conductive material.

Irrespective of the specific design of the parasitic beam shaping means 27, said beam shaping means is preferably provided in such a way that its maximum extent in the area surrounding the antenna 19 preferably does not exceed a dimension of 40 cm. In other words, the parasitic radiator means 27 is intended to be configured within a distance of at most 40 cm around the antenna 19 or in a partial region thereof. This maximum distance of the parasitic beam shaping means 27 from the antenna 19 can in many cases also be selected so as to be even less. A maximum extent of the parasitic beam shaping means 27, calculated from the antenna 19, can in many cases lie even below 35 cm, 30 cm and in particular below 25 or 24 cm. In many cases, minimized extensions of less than 20 cm or 16 cm are even sufficient.

Preferably, the more or less planar extension of the parasitic radiator means 27, i.e. of what is known as the parasitic radiator surface 27, is selected in such a way that it is larger than the counterweight surface 13 at least by 20%, preferably more than 30%, 40%, 50% and in individual cases even more than 60% or even 70% or 80%. As under certain circumstances the counterweight surface can be extremely small, in extreme cases can even be formed merely by the electrically conductive chassis 19b of the antenna 19, it then occurs that the parasitic radiator means or beam shaping means may be several hundred per cent larger than the counterweight surface thus formed.

It has now been found that above all asymmetrical configurations of this parasitic beam shaping means 27 allow the electrical receiving and if appropriate transmitting properties of an external and/or roof antenna 19 in a vehicle 1 to be improved.

As may be seen from FIG. 6, the parasitic beam shaping means 27, which, viewed from above, is somewhat elliptical in its configuration and has a grid structure, is arranged asymmetrically to the counterweight surface 13, as, for example, the parasitic beam shaping means 27 extends—in a departure from the vertical plane of symmetry 17 running in the longitudinal direction through the vehicle (when in FIG. 6 the rear window of 5d lies on the left-hand side adjoining the roof)—much more toward the right-hand half of the vehicle than toward the left side of the vehicle.

In addition, the overall configuration of the parasitic beam shaping means 27 is oriented substantially at an orientation R running forward toward the right, i.e. advancing slightly in the direction of travel, substantially toward its right end, as is indicated by the arrow R in FIG. 6. Despite this asymmetrical configuration and/or arrangement and/or orientation and alignment, improved reception of for example SDARS or GPS signals, i.e. in particular circularly polarized signals, can be achieved in this way.

Furthermore, an improvement in terms of the type of vehicle can be achieved by an asymmetrical configuration of this type of the parasitic beam shaping means 27 in contrast to the centric arrangement of an external or roof antenna and/or in contrast to a symmetrical configuration, running relative to the longitudinal axis of the vehicle, of a counterweight surface 13. In other words, optimum adaptation of an asymmetrical configuration of the parasitic radiator means 27 can be achieved as a function of different motor vehicles.

As glass manufacturers of different types of vehicle have to produce sheet glasses designed especially for the type of motor vehicle in question, this opens up the possibility of the manufacturer incorporating a design and position, determined as being optimal for a specific type of vehicle, of a parasitic beam shaping means 27 in such a way that optimum beam shaping can then be achieved during the building-on of a corresponding external or roof antenna in an antenna mounting region and/or portion 15.

It should also be noted that the, for example, grid-type configuration of the parasitic beam shaping means 27 does not have to be a closed area, as was previously indicated in FIG. 4. The reason for this is that there is provided in FIG. 4 in the region of the parasitic beam shaping means 27 a rectangular recess 61 formed in this exemplary implementation in the form of a planar grid structure.

Figure 7:
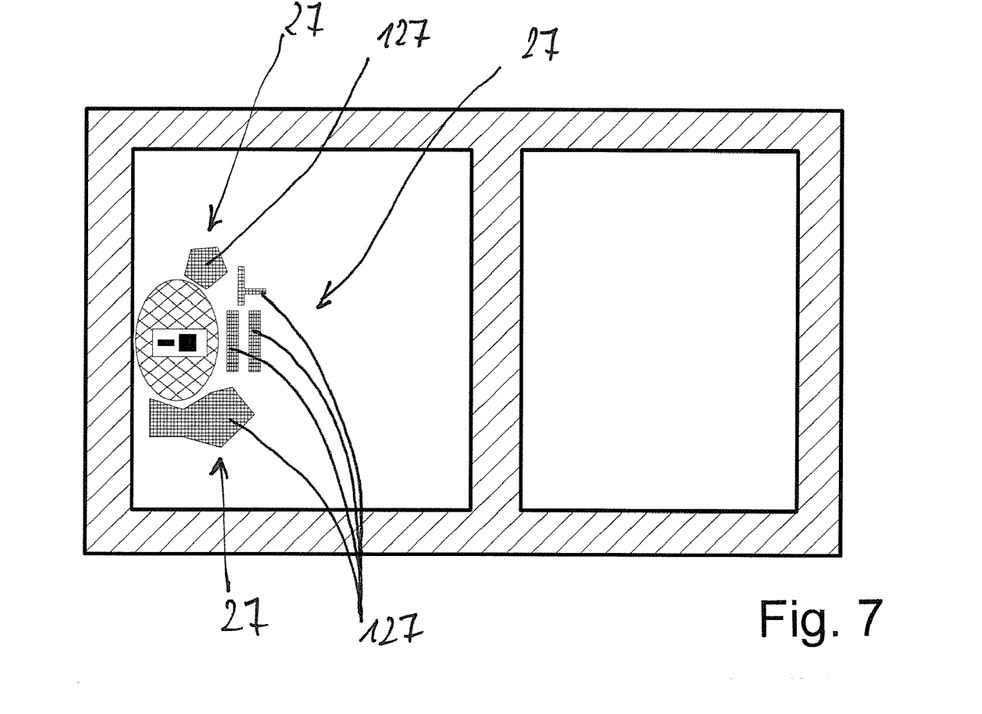
FIG. 7 shows a further modified exemplary arrangement in which the parasitic beam shaping means consists of a large number of parasitic radiator partial surfaces.

FIG. 7 shows that the parasitic beam shaping means, i.e. the parasitic radiator surfaces 27, can have a wholly unsymmetrical configuration and in addition can consist of a large number of individual parasitic radiator partial surfaces 127 which are joined together or even arranged separately. A total of five parasitic radiator partial surfaces 127, which are separate from one another and therefore constitute what are known as the parasitic partial beam shaping means 127, are provided in the exemplary implementation according to FIG. 7.

The schematic views according to FIGS. 8a to 8d, which show merely by way of example possibilities for a grid structure for the parasitic beam shaping means 27, will be examined hereinafter.

Figure 8A:
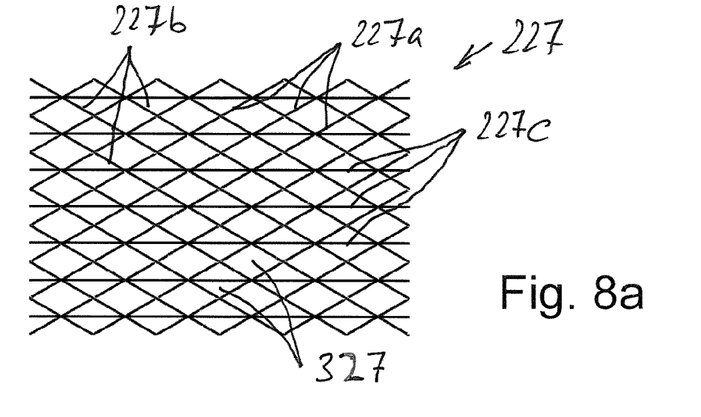
FIGS. 8a to 8d are four plan views onto different illustrative non-limiting examples of grid structures for the parasitic beam shaping means.

In the example according to FIG. 8a, the planar parasitic beam shaping means 27 is configured with a grid structure 227 comprising for example three linear grids 227a, 227b, 227c which each consist of a large number of electrically conductive lines (wires) arranged parallel to one another, the three linear structures 227a, 227b, 227c each being arranged so as to overlap and be offset from one another by 120°.

This allows triangular and hexagonal perforated structures with holes/recesses 327 to be achieved, wherein a preferred maximum diameter size of the corresponding recesses 327 of this perforated structure is intended not to exceed a dimension of 15 mm or 20 mm. In other words, an optimum hole size is between 0.5 mm and 10 mm, in particular between 0.5 mm and 5 mm and preferably between 0.5 mm and 2 mm. In extreme cases, the lower boundaries may in this regard lie even below 0.5 mm, i.e. the lower limit of the hole size may lie at 0.4 mm, 0.3 mm, 0.25 mm or even less. In other words, the grid structure is selected in such a way that the holes, recesses or spacings 327 between the individual spacings of the grid structure 227 are smaller than 10 mm, in particular smaller than 8 mm, smaller than 5 mm and preferably smaller than 2 mm. On the other hand, the holes, recesses or spacings should be at least 0.2 mm or larger, in particular larger than 0.5 mm, larger than 1 mm or even larger than 1.5 mm.

Figure 8B:
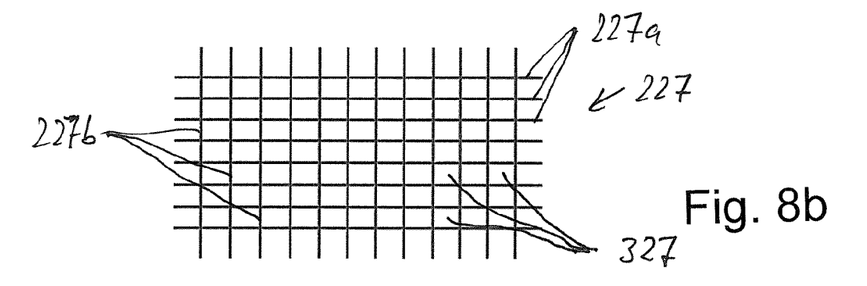

According to the exemplary arrangement according to FIG. 8b, use is made of a rectangular grid structure 227 in which two grid structures 227a and 227b, arranged from a large number of parallel conductors, are provided rotated relative to each other in the 90° direction and in this case overlap and produce overall an electrically conductive structure.

In this case too, the size of the holes 327 should preferably correspond to the dimensions mentioned hereinbefore.

Figure 8C:
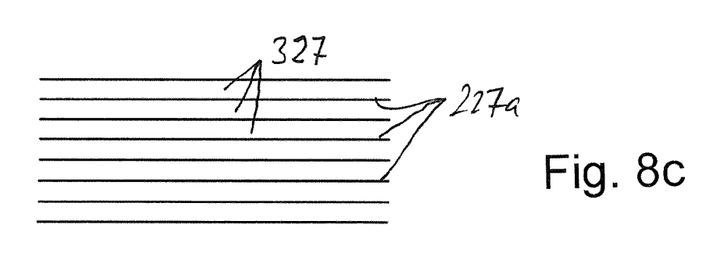

In the exemplary arrangement according to FIG. 8c, use has been made of a pure linear grid 227a, wherein in this case the linear spacing 327 of the electrically conductive conductors should preferably also fulfill the dimensions mentioned hereinbefore for the size of the perforated structures.

Figure 8D:
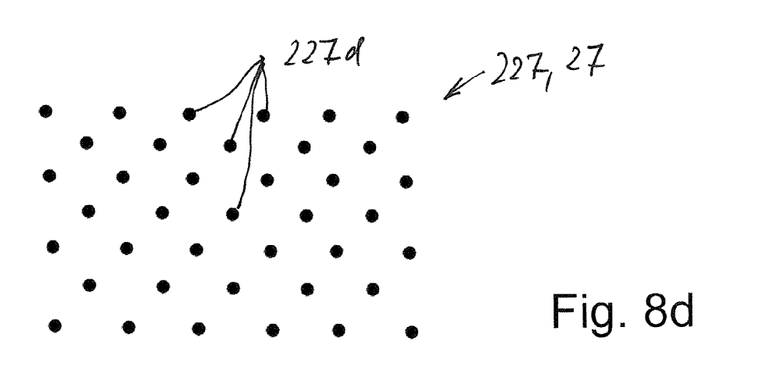

The exemplary arrangement according to FIG. 8d proposes a grid structure 227 in the form of a point structure 227c. What are known as the points 227d can consist of electrically conductive circular surfaces, elliptical surfaces or other surfaces which are shaped in any desired manner and can be provided, for example viewed from above, with a square structure, general n-polygonal structure or structures which are shaped in any desired manner and have concave and convex, round, curved and/or straight circumferential surface portions. The example according to FIG. 8d is therefore similar to the exemplary arrangement according to FIG. 7, as in FIG. 7 too, the relevant parasitic radiator partial surfaces 127 are provided for the parasitic beam shaping means 127. In the exemplary arrangement according to FIG. 8d, the large number of small conductive surfaces can at most be smaller than in the exemplary arrangement according to FIG. 7, wherein the planar elements 227d used can be provided in a larger number.

The arrangement and configuration in terms of size should, in this case too, be such as preferably to generate between the individual conductive points or islands 227d a spacing which—if possible—falls within an above-mentioned size range.

However, the aforementioned parasitic radiator means 27, some of which are referred to as parasitic radiator surfaces or parasitic radiator means, do not have to consist exclusively of a grid structure or comprise a grid structure, not even in the form of a plurality of grid structures 127. On the contrary, it is also possible for the exemplary illustrative non-limiting parasitic beam shaping means to consist of or comprise a closed area having elevated conductivity. A closed electrically conductive area (or an area having at least elevated conductivity) can for example be configured in the form of or comprise a planar metal coating (applied for example to the inside 5" of the glass window 5, 5a), in the form of a foil coated with metal, in the form of a metal foil or for example also in the form of a screen printed surface having, if suitable materials are used, the desired elevated conductivity.

In this case too, the maximum distance between the antenna 19 and the most remote portion of the parasitic radiator means thus formed should preferably be not more than 40 cm, the above-mentioned maximum distances, which are minimized relative thereto, often being sufficient in this case too.

Figure 9:
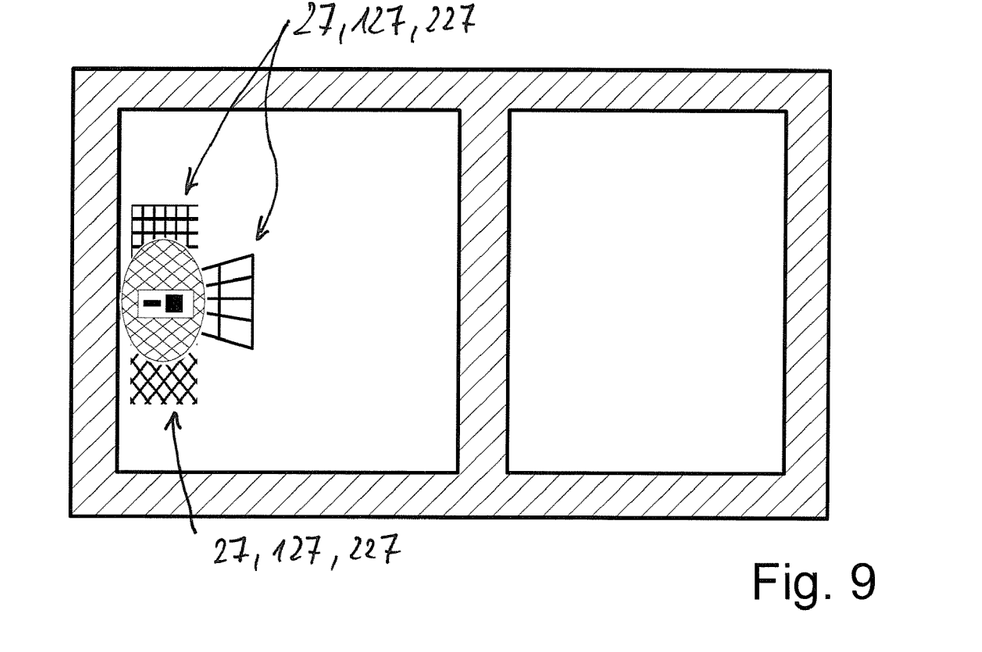
FIG. 9 is a plan view onto a further modified exemplary arrangement to illustrate that the parasitic radiator partial surfaces can consist of different grid structures.

Reference will be made hereinafter to the exemplary non-limiting arrangement according to FIG. 9, which merely shows that the parasitic beam shaping means 27 can also consist of parasitic radiator partial surfaces or what are known as the partial beam shaping means 127 (so that the beam shaping means 27 as a whole is broken down into a plurality of partial beam shaping means 127), each parasitic radiator partial surface 127, i.e. each parasitic partial beam shaping means 127, having a different grid structure, with a different orientation of the grid structure, a different design in which grid lines intersect one another deviating perpendicularly therefrom, in which grid lines are arranged in a partly diverging manner, if appropriate also on curved lines running with altered spacing from one another, etc. In this respect too, there are no limitations. In this case, the parasitic radiator partial surfaces 127 can also be connected to one another, or groups of partial surfaces can be connected to one another while others are not. In this case too, there are no limitations. In this exemplary implementation too, some or all partial beam shaping surfaces 127 (i.e. some or all radiator partial surfaces 127) can consist of or comprise an above-mentioned closed area (i.e. not having a grid structure) having elevated conductivity.

As also emerges from the schematic views, the parasitic radiator means 27 is preferably arranged in the form of the grid structures 127 arranged in a planar manner, preferably projecting beyond the counterweight surface 13. It can in this case also—although this is less important—additionally be provided below the counterweight surface 12. In addition, the parasitic beam shaping means 27 can be configured, in terms of its design and position, in such a way that it ends, viewed from above, before or at the latest at electrically conductive bodywork parts. Irrespective of this, the parasitic beam shaping means 27 could also be integrated in such a way that it underlies electrically conductive bodywork parts, set apart therefrom, in particular lying inside the vehicle. In this way, a certain capacitive coupling to the electrically conductive bodywork metal sheet could be achieved.

Figure 10:
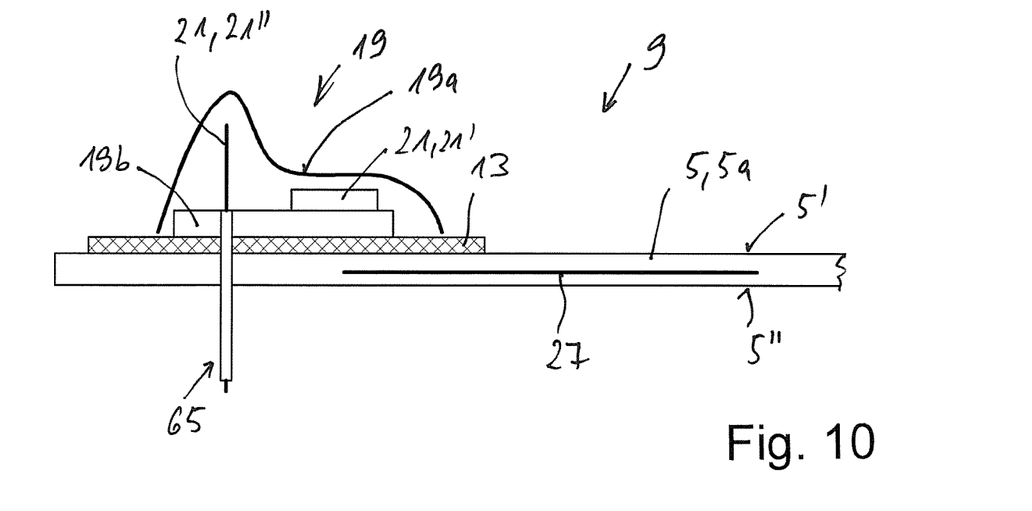
FIG. 10 is a schematic cross-sectional view through an exemplary illustrative non-limiting parasitic beam shaping means in the glass with a counterweight surface located thereabove.
Figure 11:
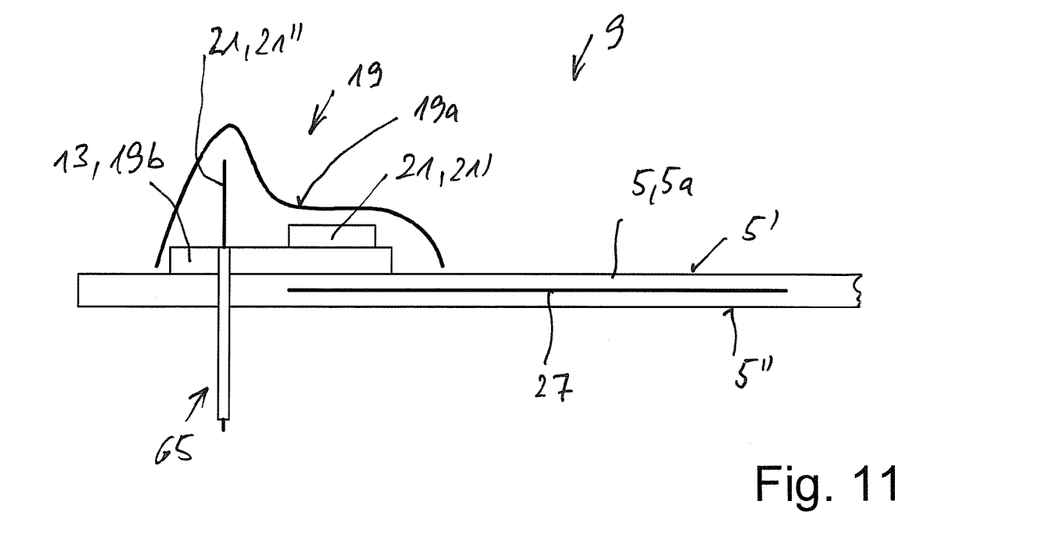
FIG. 11 is a cross-sectional view similar to FIG. 10, but from which a separate counterweight surface has been omitted, so that merely the electrically conductive chassis of the antenna itself is the counterweight surface.

Finally, reference will also be made to the schematic cross-sectional view according to FIGS. 10 and 11.

An antenna arrangement 19 is shown in the exemplary implementation according to FIG. 10 in a section through a window 5, for example in the roof region 9 of a motor vehicle, the window 5 being represented on the one hand schematically in section, with the inner parasitic beam shaping means 27 which is indicated linearly in section and, according to the illustrated exemplary implementations, can be configured in a different grid structure or in the form of a closed (grid-free) area and in the form of partial surfaces or a continuous area.

The aforementioned counterweight surface 13, which can be manufactured by the manufacturer during the manufacture of the glass window 5 (for example the panoramic glass window) and attached there (for example by adhesion, etc.), is arranged above the glass window 5, i.e. on the glass upper side 5'.

An antenna 19, which has an antenna housing 19a below which an electrically conductive chassis 19b is fastened to the electrically conductive counterweight surface 13, is then attached on this counterweight surface 13. The aforementioned one or more individual antennas 21, for example in the form of GPS antennas, SDARS antennas, mobile communications antennas, etc., can then be provided on this chassis 19b, a patch antenna 21' and a monopole antenna 21" being indicated for example in the variant according to FIG. 10. A coaxial antenna connection cable 65 penetrates in this case the glass window 5 and its outer jacket contacts the antenna chassis 19b. This antenna chassis 19b then constitutes with the counterweight 13 the mass reference for the antenna 19, i.e. the radiators 21.

In the exemplary implementation according to FIG. 11, the use of a separate counterweight surface 13 has been dispensed with. In other words, in this case, the electrically conductive chassis 19b is attached directly on the upper side 5' of the glass window 5. In this case, the chassis 19b of the antenna 19 itself acts as the counterweight surface 13. The outer jacket of the coaxial cable 65 is in this case also tangent to the antenna chassis 19b which now alone constitutes the mass reference of the antenna 19. Also indicated in the cross-sectional view according to FIG. 11 is again the parasitic radiator surface 27, i.e. the parasitic beam shaping means 27, which partly still extends below the chassis 19b, but for the most part extends well beyond it even in the plan view onto the window 5.

The formation of the parasitic beam shaping means 27 has, viewed in the plane of its configuration, a thickness which is merely a fraction of the thickness of the window, generally less than 50%, in particular less than 25%, even less than 20%, 15%, 10% and in particular less than 5% of the material thickness of the electrically non-conductive vehicle structure, in particular in the form of the glass window 5. In principle, the parasitic radiator means 27 could also be used in other non-transparent materials, provided that they are electrically non-conductive, i.e. for example in plastics material superstructures of the vehicle.

Figure 12:
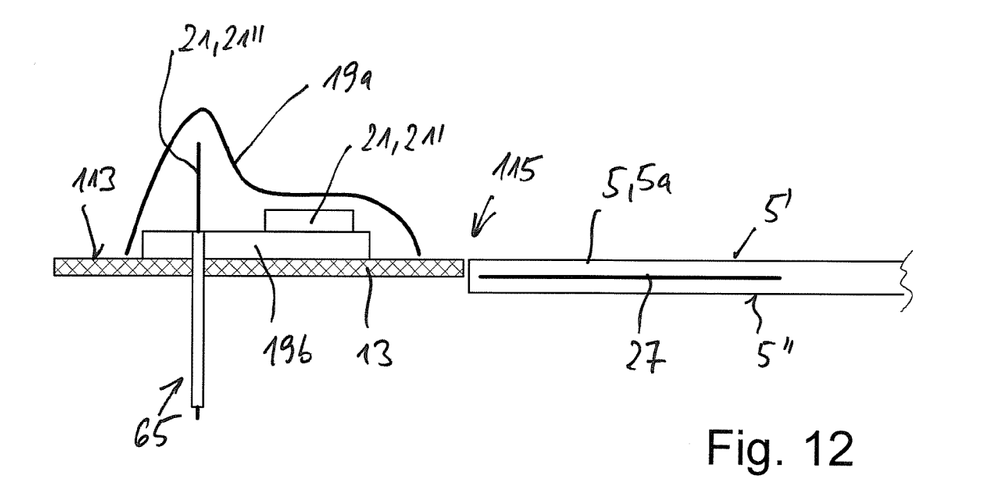
FIG. 12 is a vertical cross section of an exemplary arrangement, further to those in FIGS. 10 and 11, in which the counterweight surface for an antenna is arranged within a cutout in the glass roof.
Figure 13:
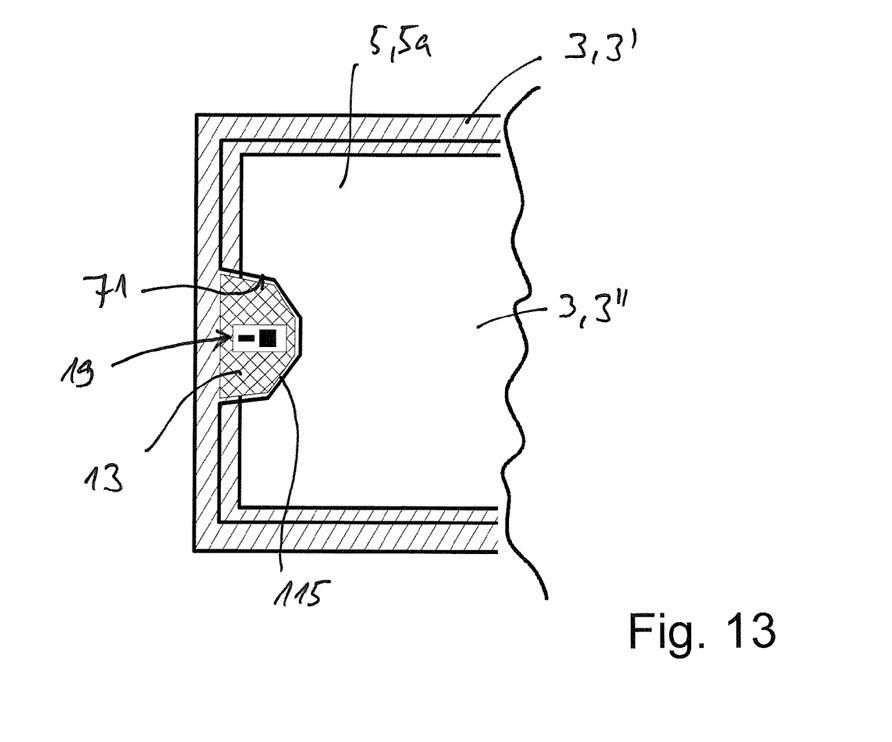
FIG. 13 is a plan view onto the exemplary arrangement illustrated in FIG. 12.

In conclusion, a further modified exemplary implementation according to FIGS. 12 and 13 will be examined.

The exemplary implementation according to FIGS. 12 and 13 differs from that according to FIGS. 10 and 11 in that, in the exemplary implementation according to FIGS. 12 and 13, the counterweight surface 13 is not located on or above the glass roof 5, 5a, i.e. generally the motor vehicle structure 3 which is made of electrically non-conductive material 3", but rather is in a recess 71 provided in the glass roof 5, 5a at the point at which the counterweight surface 71 sits. This has the advantage that the upper side 113 of the counterweight surface 13 and the upper side 5' of the glass or glass roof 5, 5a are located at the same level, i.e. in the same or almost the same plane, and are therefore preferably flush with each other at their transition 115. In this case, the antenna cable 65 (preferably in the form of at least one coaxial cable or in the form of a plurality of cables or coaxial cables) does not have to penetrate the glass window 5, 5a either, so that a corresponding through-opening or bore is in this case not necessary in the glass 5. The beam shaping means 27 is located in this exemplary implementation below or laterally of the upper side of the counterweight surface.

In this exemplary implementation too, in particular, the counterweight surface 13 can be part of the motor vehicle structure in the form of an electrically conductive bodywork 3, 3'. Equally, the counterweight surface 13 can in this exemplary implementation also be separated from the electrically conductive motor vehicle structure 3, but be electrically connected or capacitively coupled thereto by an electrical cable connection or another form of connecting means.

Suitable sealing measures are provided at the transition between the glass window 5, which is flush with the upper side, and the counterweight surface 13.

The exemplary arrangement has been described for a parasitic beam shaping means which has also been referred to on occasions as a parasitic radiator means or parasitic radiator surfaces. All references to a "planar" configuration have referred to an electrically conductive structure and in particular a planar structure which can also consist of electrically conductive structures which are electrically isolated from one another, as was shown in particular also with reference to the exemplary arrangements according to FIGS. 7 and 9. In the exemplary arrangement according to FIG. 8c too, the linear grid can consist of wires 227a which are electrically not connected to one another or else are interconnected. In the electrical structure of according to FIG. 8d, the individual electrically conductive surfaces 227d are generally electrically isolated from one another.

What is known as the "planar" structure is therefore preferably arranged in a plane which does not have to be flat, but rather can be spatially curved. The curvature of this electrically conductive structural surface or plane has in this case generally at least a slight curvature corresponding to the curvature of the corresponding glass surface in the motor vehicle. As the electrically conductive structures for the beam shaping means are configured preferably in a central layer, i.e. a layer located inside the glass window or on a layer lying on the inside of the glass window, the glass window fixes the corresponding course of curvature in the respective structural plane or structural surface. This also applies to all other non-conductive bodywork superstructures which are made for example of plastics material, etc. and on which or in which each of the conductive structural surfaces or structural planes are provided for the beam shaping means.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

The invention claimed is:

1. A beam shaping means for an external and/or roof antenna on vehicles, comprising:
    an antenna mounting region or portion for being disposed at an electrically non-conductive region of a vehicle structure, in the form of a glass window, an antenna mounting region or portion,
    the antenna mounting region or portion comprising a counterweight surface attached to the electrically non-conductive region of the vehicle structure,
    the beam shaping means being configured as a parasitic beam shaping means,
    the parasitic beam shaping means being configured at a distance below the upper or outer surface of the electrically non-conductive region of the vehicle structure,
    the parasitic beam shaping means being configured, provided or attached in the material of the electrically non-conductive region of the vehicle structure or at the underside or inside of the electrically non-conductive region of the vehicle structure,
    the parasitic beam shaping means being arranged and/or configured in such a way that it, viewed from above, protrudes laterally beyond, at least in certain portions, the antenna mounting region or portion and/or an optionally provided counterweight surface and/or is arranged laterally thereto.

2. The beam shaping means as claimed in claim 1, wherein the parasitic beam shaping mean is arranged and/or configured asymmetrically to a vertical plane of symmetry running in the longitudinal direction of the vehicle.

3. The beam shaping means as claimed in claim 1, wherein the parasitic beam shaping means is arranged and/or configured symmetrically to a vertical plane of symmetry running in the longitudinal direction of the vehicle.

4. The beam shaping means as claimed in claim 1, wherein the parasitic beam shaping means is of a design and/or size which differ as a function of the vehicle.

5. The beam shaping means as claimed in claim 1, wherein the parasitic beam shaping means consists of or comprises a grid structure extending in a substantially planar manner.

6. The beam shaping means as claimed in claim 5, wherein the grid structure consists of at least two parallel grids which are arranged in an intersecting orientation, the grids and being connected in an electrically conductive manner at the points of intersection.

7. The beam shaping means as claimed in claim 5, wherein the grid structure comprising an electrically conductive line grid.

8. The beam shaping means as claimed in claim 5, wherein the grid structure comprises a point grid.

9. The beam shaping means as claimed in claim 5, wherein the grid structure is constructed in such a way that the holes, recesses or spacings thus formed between the individual portions of the grid structure are smaller than 10 mm.

10. The beam shaping means as claimed in claim 5, wherein the grid structure is formed in such a way that the holes or spacings between the electrically conductive individual grid elements are larger than 0.2 mm.

11. The beam shaping means as claimed in claim 5, wherein the grid structure is constructed in such a way that the holes, recesses or spacings thus formed between the individual portions of the grid structure are smaller than 8 mm.

12. The beam shaping means as claimed in claim 5, wherein the grid structure is constructed in such a way that the holes, recesses or spacings thus formed between the individual portions of the grid structure are smaller than 5 mm.

13. The beam shaping means as claimed in claim 5, wherein the grid structure is constructed in such a way that the holes, recesses or spacings thus formed between the individual portions of the grid structure are smaller than 2 mm.

14. The beam shaping means as claimed in claim 5, wherein the grid structure is formed in such a way that the holes or spacings between the electrically conductive individual grid elements are larger than 0.5 mm.

15. The beam shaping means as claimed in claim 5, wherein the grid structure is formed in such a way that the holes or spacings between the electrically conductive individual grid elements are larger than 1 mm.

16. The beam shaping means as claimed in claim 5, wherein the grid structure is formed in such a way that the holes or spacings between the electrically conductive individual grid elements are larger than 1.5 mm.

17. The beam shaping means as claimed in claim 1, wherein the parasitic beam shaping means comprising a closed area or substantially closed area having elevated conductivity, in the form of a planar metal coating, a metal foil or a foil coated with metal, or an electrically conductive screen printed surface.

18. The beam shaping means as claimed in claim 1, wherein the parasitic beam shaping means comprises a plurality of parasitic radiator partial surfaces or partial beam shaping means.

19. The beam shaping means as claimed in claim 18, wherein the parasitic beam shaping means have or comprises at least partly different grid structures and/or at least one parasitic partial beam shaping means in the form of a closed radiation surface or a closed radiation surface portion having elevated electrical conductivity.

20. The beam shaping means as claimed in claim 18, wherein the parasitic beam shaping means are not electrically connected to one another.

21. The beam shaping means as claimed in claim 1, wherein the at least one parasitic beam shaping means comprises an additional, separate recess which is larger than the grid structure provided.

22. The beam shaping means as claimed in claim 1, wherein the at least one parasitic beam shaping means has an n-polygonal outline and/or convex and concave outline delimiting lines.

23. The beam shaping means as claimed in claim 1, wherein the electrically non-conductive region of the vehicle structure consists of a glass window, in the form of a glass roof or a rear window.

24. The beam shaping means as claimed in claim 1, further including a counterweight surface which also comprises the antenna mounting region or portion, the counterweight surface being provided in the form of a glass window on the outside of the electrically non-conductive region of the vehicle structure.

25. The beam shaping means as claimed in claim 24, wherein the parasitic beam shaping means extends to below the region of the counterweight surface or begins at the transition region or laterally offset therefrom and is arranged next to the counterweight surface.

26. The beam shaping means as claimed in claim 1, wherein the counterweight surface is arranged in a cutout in the electrically non-conductive material of the vehicle structure, in the form of a glass window, so that the upper side of the counterweight surface and the upper side of the electrically non-conductive material are flush with each other, in the form of the glass window, the parasitic beam shaping means beginning lying at the circumferential edge of the counterweight surface or laterally offset therefrom.

27. The beam shaping means as claimed in claim 1, wherein the parasitic beam shaping means has a thickness corresponding to less than 50% of the electrically non-conductive region of the vehicle structure.

28. The beam shaping means as claimed in claim 1, wherein the parasitic beam shaping means is embedded by the manufacturer in electrically non-conductive materials of the vehicle structure, adjacent to or set apart from an intermediate layer provided in the electrically non-conductive material.

29. The beam shaping means as claimed in claim 1, wherein the distance between an antenna mounting region or portion or the center thereof and the most remote portion on the parasitic beam shaping means is 40 cm or less.

30. A vehicle antenna, in particular a motor vehicle antenna, which can be constructed or is constructed on the upper side or outside at an electrically non-conductive portion of a vehicle structure, wherein the external or roof antenna can be constructed or is constructed on an electrically non-conductive portion of the vehicle structure comprising a parasitic beam shaping means as claimed in claim 1.

31. The vehicle antenna as claimed in claim 30, wherein the counterweight surface is formed by the chassis of the external and/or roof antenna.

32. The vehicle antenna as claimed in claim 30, wherein the maximum distance between an external and/or roof antenna and the parasitic beam shaping means is at most 40 cm.

33. The vehicle antenna as claimed in claim 1, wherein the antenna sits on a counterweight surface arranged above the parasitic beam shaping means.

* * * * *